Aug. 28, 1956   J. E. SOLECKI   2,761,064
ELECTRIC OSCILLATOR
Filed June 13, 1951   2 Sheets-Sheet 1

INVENTOR.
J. E. SOLECKI
BY
ATTORNEY

Aug. 28, 1956  J. E. SOLECKI  2,761,064
ELECTRIC OSCILLATOR
Filed June 13, 1951  2 Sheets-Sheet 2

INVENTOR.
J. E. SOLECKI
BY
ATTORNEY

United States Patent Office 2,761,064
Patented Aug. 28, 1956

2,761,064

ELECTRIC OSCILLATOR

John E. Solecki, Indianapolis, Ind., assignor to Western Electric Company, Incorporated, New York, N. Y., a corporation of New York Application June 13, 1951, Serial No. 231,343

5 Claims. (Cl. 250—36)

This invention relates to control apparatus, and more particularly to sensitive metering and control apparatus.

In the electroplating field there has been a need for a self-resetting or self-repeating type of apparatus which would permit a predetermined small cumulative quantity of electricity to be forced through an article being plated, and then stop the electroplating process. This is particularly true where precious metals are electroplated onto articles. Apparatus satisfactory for this purpose has not been available in the electroplating field inasmuch as no apparatus sufficiently sensitive to meter the relatively small cumulative quantities of electricity used in plating precious metals and yet able to actuate control mechanisms has been known.

An object of the invention is to provide new and improved control apparatus.

A further object of the invention is to provide sensitive metering and control apparatus.

Another object of the invention is to provide a highly sensitive meter and relay system operable by the meter wherein only a small amount of power is required to actuate the relay system.

In an apparatus illustrating certain features of the invention, there may be provided a needle rotated by an ampere-minute meter at a slow rate of speed, an oscillatory circuit including a pair of coils normally holding a relay in one condition when there is no inductance introduced into the field of either of the coils. The coils are so spaced relative to the travel of the needle so that when the needle enters the field of one of the coils the oscillatory circuit is upset and the relay is deenergized.

A complete understanding of the invention may be obtained from the following detailed description of an apparatus forming one embodiment thereof, when read in conjunction with the appended drawings, in which Fig. 1 is a perspective view of an apparatus forming one embodiment of the invention;

Figure 1:
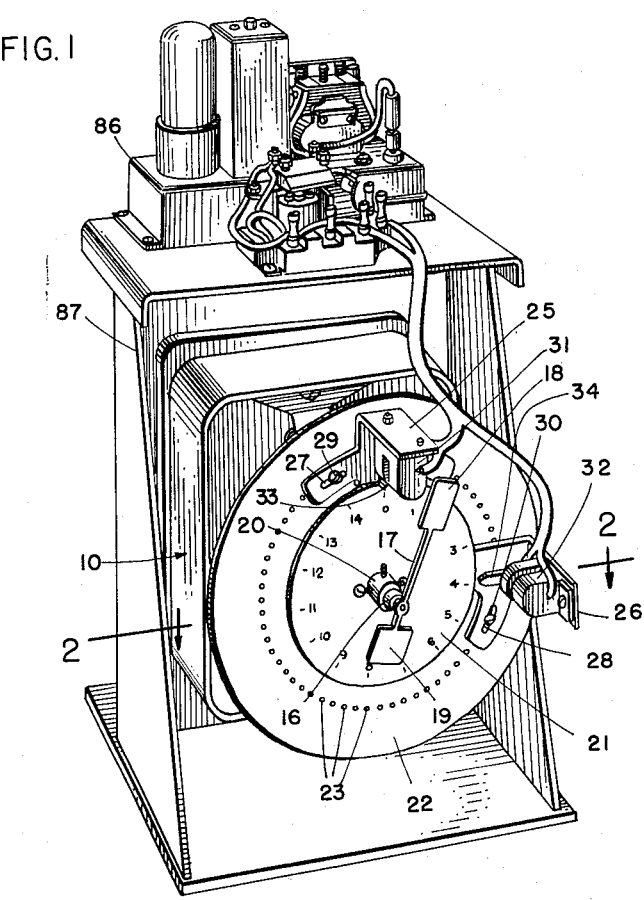
Figure 2:
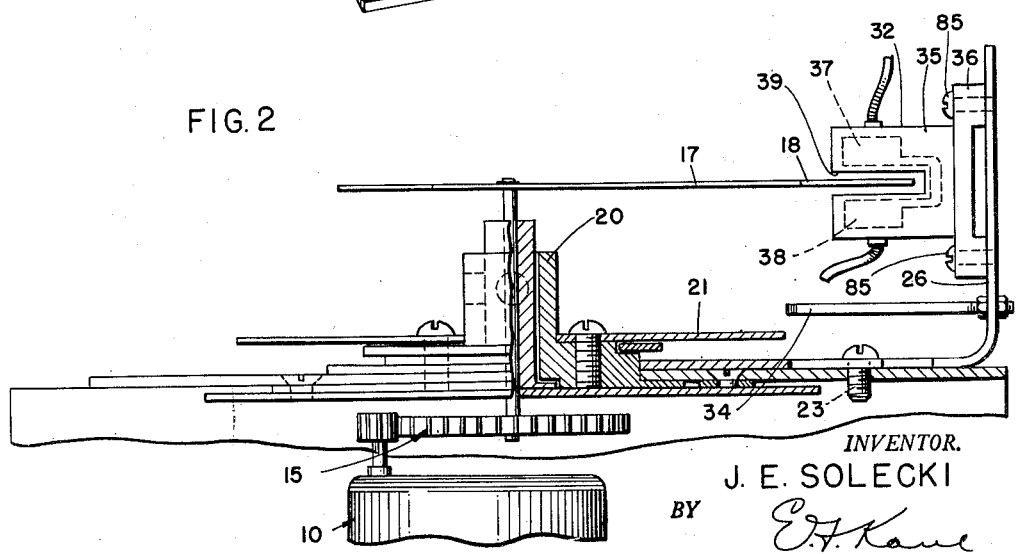
Fig. 2 is an enlarged horizontal section taken along line 2—2 of Fig. 1.

Referring now in detail to the drawings, there is shown therein a D. C. meter 10 of a highly sensitive type, which measures the cumulative quantity of electricity forced through a winding 11 in response to the product of the minutes and the amperes through the winding 11. The meter 10 is a mercury motor type meter, which is a well-known commercially available type meter, and includes an armature 12, which is driven by the flow of current through the coil 10, and a pole piece or core 13.

Depending upon the direction of flow of the current through the winding 11, the armature 12 is rotated to drive through a chain of gears 15 and a shaft 16, a pointer 17 mounted on the shaft 16. The pointer 17 is provided with a tip 18 composed of material having a low permeability different from air, such as aluminum or the like. The pointer also may be of iron. At the other end of the pointer 17 is provided a tip 19 counterbalancing the tip 18. The shaft 16 is rotatable in a bearing 20 relative to a dial 21 calibrated in ampere-minutes. The dial is fixed relative to a mounting plate 22 having tapped bores 23—23 formed therein. Brackets 25 and 26 having slots 27 and 28 therein may be secured adjustably to the plate 22 by screws 29 and 30, respectively, to locate split inductance coils 31 and 32 adjustably with respect to the dial 21. The brackets 25 and 26 are provided with pointers 33 and 34, respectively, to indicate the positions in which the coils are mounted relative to the dial.

The induction coil 32 includes a housing 35 having a base plate 36 secured to the bracket 26, and coil halves 37 and 38 of the coil 32 are molded in the housing 35 in aligned, additive positions with a slot 39 formed in the housing 35 between the coil halves 37 and 38. When the coil halves 37 and 38 are energized and the tip 18 of the pointer 17 is moved between the coil halves 37 and 38, the inductive reactance of the coil halves 37 and 38 is increased. The coil halves 37 and 38 are connected in series by conductors 41 and 42 to contacts 43 and 44, respectively. The contacts 43 and 44 are connected by conductors 45 and 46 to conductors 47 and 48 connected to a tank circuit 49 of an oscillatory circuit 50. The circuit 50 includes an oscillatory tube 51 having a plate 52 connected to a tuned plate tank circuit 53, a screen grid 54 connected by a resistor 55 to one side of a secondary winding 56 of a transformer 57, a cathode 58 connected by a grounded conductor 59 to the other side of the secondary winding 56 and a control grid 60 connected through a variable condenser 61 to the adjustable tank circuit 49.

A relay winding 62 is connected in the plate circuit of the tube 51, and holds normally open contacts 63 closed when energized. A 110 volt A. C. powerline 65 supplies power to a primary winding 66 of the transformer 57. Normally, the oscillatory circuit 50 oscillates at an intermediate frequency so that the relay winding 62 is energized sufficiently to keep the contact 63 closed. However, when the tip 18 of the pointer 17 is moved between the coil halves 37 and 38, the inductive reactance of these coils is raised sufficiently that the balance of the oscillatory circuit 50 is upset to such an extent that the resulting oscillations are of a frequency such as to cut down the plate current to deenergize the winding 62.

The inductive coil 31 is identical with the coil 32 and includes coil halves 67 and 68 connected by conductors 69 and 70 to contacts 71 and 72, which are connected in turn to the conductors 47 and 48, respectively. The contacts 43 and 44 and 71 and 72 are part of the same relay. When the contacts 43 and 44 are closed, the contacts 71 and 72 are opened and vice versa. The direction of flow of a current from a D. C. powerline 79 through the winding 11 is controlled by interlocked reversing contacts 80, 81, 82 and 83. The base 36 may be detached from the bracket 26 by removing screws 85—85, and the oscillator circuit elements are mounted on a chassis 86 fastened detachably to a supporting bracket 87 and detachable from the bracket for repairs thereto. The bracket 87 itself may be inserted into and removed from control panels with a minimum of effort whenever maintenance or repair is required.

*Operation*

When a D. C. control current is forced through the winding 11, it drives the armature 12 in a predetermined direction depending in which direction the control current is forced through the winding 11. Assuming that the armature 12 is rotated in a clockwise direction by the winding 11, the rate of rotation of the pointer 17 is proportional to the magnitude of the current flowing through the winding 11, and the spur gearing 15 reduces the rate of rotation of the pointer 17 to a small fraction of the rate of rotation of the armature 12. When a predetermined quantity of electricity has flowed through the winding 11, the pointer 17 is moved into a position direction between the coil halves 37 and 38. This changes the inductive reactance of the coils 37 and 38 sufficiently to throw the tank circuits 49 and 53 out of balance, thereby changing the oscillations of the circuit 50 to such a frequency that the plate current is reduced, and the relay winding 62 is deenergized to open the contact 63. The relay contact 63 may be in series with a device utilizing the current forced through the relay, for example, an electroplating circuit, so that the current to the device is stopped when the tip 18 of the pointer 17 is positioned between the coil halves 37 and 38. The contacts 43 and 44 then are opened and the contacts 71 and 72 are closed by suitable relay construction or manually, which restores the balance of the oscillatory circuit 50, and the relay winding 62 is energized.

Figure 3:
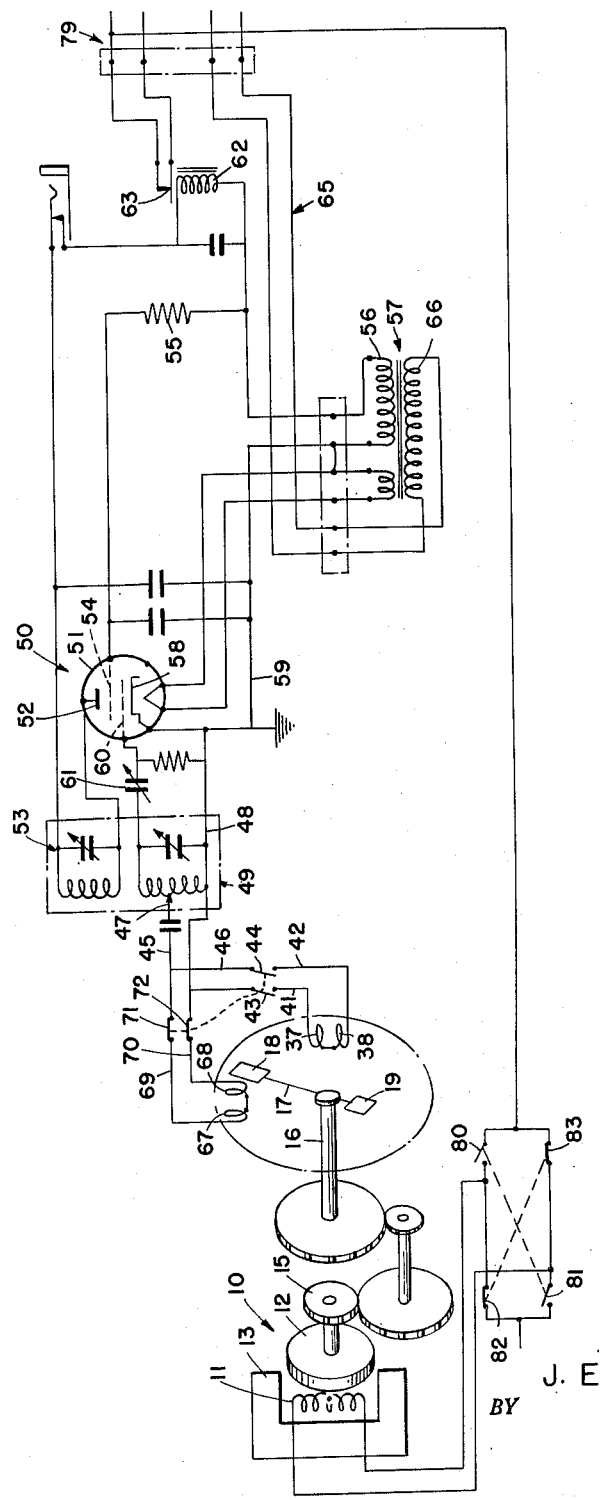
Fig. 3 is a diagrammatic view of a control circuit of the apparatus shown in Fig. 1.

The contacts 80 and 81 then are opened and switches 82 and 83 are opened manually or by suitable relay construction, to reverse the direction of current through the winding 11. Then, assuming the circuit including the meter winding 11 and the powerline 79 is reclosed, the armature 12 is driven in a direction as to rotate the pointer 17 in a counterclockwise direction, as viewed in Fig. 3, from the coil halves 37 and 38 toward the coil halves 67 and 68. When a predetermined quantity of electricity has flowed through the meter winding 11 in that direction, the tip 18 of the pointer 17 is moved to a position directly between the coil halves 67 and 68 to change the reactance of these coils to such an extent that the balance of the oscillatory circuit 50 is upset.

The above-described apparatus provides fine controls for plating operations and the like wherein small currents are utilized. The above-described apparatus may be utilized in any other circuit in which a total amount of electricity is permitted to flow and then is to be automatically stopped. The meter and elements driven thereby are alternately operable in opposite directions, and the coil halves 67 and 68 are energized alternately with the coil halves 37 and 38.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A control apparatus, which comprises a work circuit including a source of direct current, a reversible ampere-minute meter including a winding and an armature, reversible switching means for connecting the winding reversibly in the work circuit, a dial, a pointer having a tip composed of material having a permeability different from that of air mounted rotatably on the dial, a spur gear train connecting the armature to the pointer, whereby the pointer is driven by the armature along a predetermined path, a pair of coils, means mounting the coils adjustably relative to one another at predetermined points adjacent to the path of the tip of the pointer, an oscillator tube, a plate tank circuit, a grid tank circuit connected to the grid of the tube, and switching means for alternately connecting the coils to the grid tank circuit, each of said coils serving when connected to the grid tank circuit and having only air in the field thereof to cause oscillations in the plate circuit of a predetermined frequency and serving when connected to the grid tank circuit and the tip of the pointer is moved adjacent thereto to reduce current flow in the plate circuit.

2. A control apparatus, which comprises a work circuit including a source of current, a reversible ampere-minute meter including a winding and an armature, reversible switching means for connecting the winding reversibly in the work circuit, a dial, a pointer having a magnetically permeable tip mounted rotatably on the dial, a spur gear train connecting the armature to the pointer, whereby the pointer is driven by the armature along a predetermined path, a pair of coils, means mounting the coils adjustably relative to one another at predetermined points adjacent to the path of the tip of the pointer, an oscillatory circuit including a tube and including a grid tank circuit connected to the grid of the tube and a plate tank circuit connected to the plate of the tube, and switching means for alternately connecting the coils to the grid tank circuit, each of said coils serving when connected to the grid tank circuit and having no extraneous magnetic material in the field thereof to cause oscillations in the plate circuit of one frequency, and serving when connected to the tank circuit and the tip of the pointer is moved adjacent thereto to cause oscillations in the plate circuit of another frequency.

3. A control apparatus, which comprises a dial, a supporting plate supporting the dial and provided with a plurality of tapped bores spaced along a circle concentric with the dial, a pair of brackets having adjustment slots, a plurality of screws for entering the tapped bores through the slots to secure the brackets to the supporting plate adjustably, a pair of coils mounted on the brackets, a pointer having a magnetic tip rotatable on the dial to positions adjacent to the coils, an oscillatory circuit coupled with the coils and responsive to change in reactance of one of the coils when the magnetic tip of the pointer is adjacent thereto, a reversible ampere-minute meter for driving the pointer from one coil to the other, selectively operable means for driving the meter alternately in opposite directions, and means interlocked with the reversible means for selectively coupling the coils to the oscillatory circuit.

4. A control apparatus, which comprises a pair of coils mounted at points spaced along an arc, a pointer having a magnetic tip rotatable along said arc to positions adjacent to the coils, an oscillatory circuit coupled with the coils and responsive to change in reactance of one of the coils when the magnetic tip of the pointer is adjacent thereto, reversible means for driving the pointer from one coil to the other, and means interlocked with the reversible means for selectively coupling to the oscillatory circuit the coil toward which the pointer is moved and disconnecting the other coil from said circuit.

5. A control apparatus, which comprises a pointer having a permeable tip, a reversible ampere-minute motor for moving the tip of the pointer along a predetermined path, a coil mounted at one end of the path, a second coil mounted at the other end of the path, a D. C. source, reversible means for connecting the motor to the D. C. source, oscillator means actuatable when connected to one of the coils and the pointer tip is in the field of that coil, and reversible switching means for disconnecting from the oscillator means the coil to which the pointer has been moved and connecting the other coil to the oscillator means.

References Cited in the file of this patent

UNITED STATES PATENTS

| Re. 21,155 | Miller | July 8, 1939 |
| 1,314,471 | Gow | Aug. 26, 1919 |
| 2,411,247 | Cohen | Nov. 19, 1946 |
| 2,412,782 | Palmer | Dec. 17, 1946 |
| 2,487,523 | Coake | Nov. 8, 1949 |
| 2,505,577 | Rich | Apr. 25, 1950 |
| 2,540,728 | Hansen et al. | Feb. 6, 1951 |
| 2,559,266 | Wannamaker | July 3, 1951 |